United States Patent [19]
Hindman et al.

[11] Patent Number: 6,080,065
[45] Date of Patent: Jun. 27, 2000

[54] TEARING CONFIGURATION FOR FLEXIBLE ELEMENT OF ELASTOMERIC COUPLING

[75] Inventors: Donald W. Hindman, Menomonee Falls; Randal S. Abbrederis, West Allis; Edward J. Ward, Muskego, all of Wis.; Edward W. McCullough; John D. Smihal, both of Warren, Pa.

[73] Assignee: Rexnord Corporation, Milwaukee, Wis.

[21] Appl. No.: 09/120,948

[22] Filed: Jul. 22, 1998

[51] Int. Cl.⁷ .......................................................... F16D 9/00
[52] U.S. Cl. ................................................. 464/32; 464/88
[58] Field of Search .................................. 464/32, 51, 79, 464/80, 88; 403/2; 285/2, 229

[56] References Cited

U.S. PATENT DOCUMENTS

| | | | |
|---|---|---|---|
| 1,107,315 | 8/1914 | Krebbs | 464/903 |
| 1,501,187 | 7/1924 | Rayfield | 464/903 |
| 2,971,356 | 2/1961 | Reuter et al. | 464/903 |
| 3,178,906 | 4/1965 | Ricketts . | |
| 3,524,332 | 8/1970 | Callies . | |
| 3,577,621 | 5/1971 | De Gain et al. | 464/79 |
| 3,702,545 | 11/1972 | Schlotmann et al. | 464/80 |
| 3,982,408 | 9/1976 | Wright . | |
| 3,989,408 | 11/1976 | Wright | 464/32 |
| 4,634,400 | 1/1987 | Butzow et al. . | |
| 5,318,480 | 6/1994 | Essi et al. | 464/175 |
| 5,611,732 | 3/1997 | Tirumalai . | |

FOREIGN PATENT DOCUMENTS

| | | | |
|---|---|---|---|
| 2653505 | 4/1991 | France | 464/80 |
| 757722 | 4/1953 | Germany | 464/80 |
| 1221858 | 7/1966 | Germany | 464/88 |
| 159761 | 3/1979 | Netherlands | 464/80 |

Primary Examiner—Terry Lee Melius
Assistant Examiner—Greg Binda
Attorney, Agent, or Firm—Quarles & Brady LLP

[57] ABSTRACT

Disclosed herein is an elastomeric coupling for transmitting torque between two shafts approximately aligned on a shaft axis, the coupling comprising a composite arcuately extending member including a shoe having a first portion and a second portion extending from the first portion and adapted to be connected to one of the shafts, and an elastomeric center element having, in a radial plane extending from and along the shaft axis, an inwardly opening generally U-shaped cross-section defined by two axially spaced radially extending leg portions respectively including an inner part bonded to the first portion of the shoe, and an outer part, and an axially extending bridge portion connected to the outer parts and including a weakened area which is located remotely from the shaft axis and which facilitates tearing of the bridge portion at the area in response to excessive transmission of force as compared to tearing of the bridge portion at other areas.

15 Claims, 1 Drawing Sheet

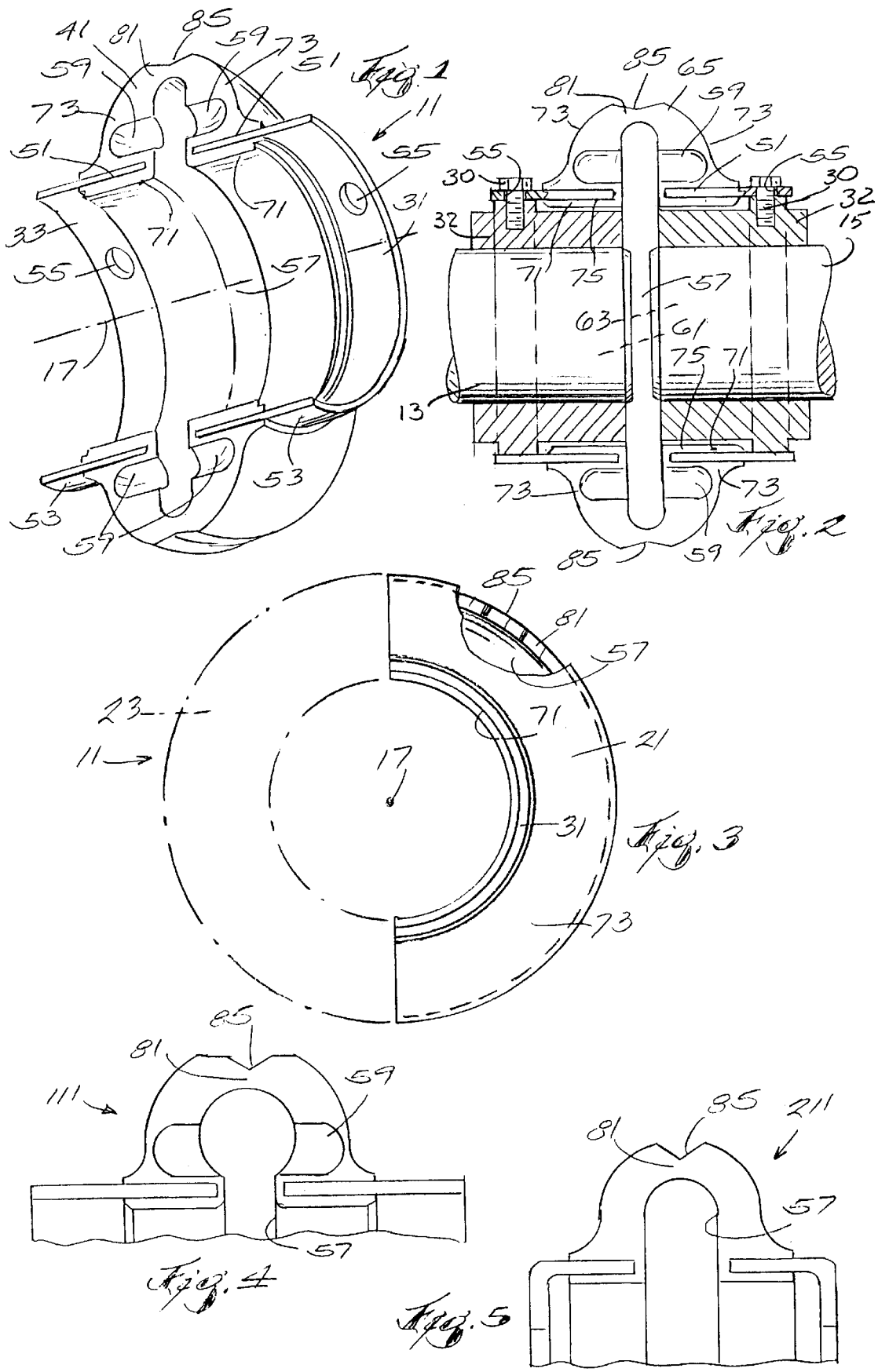

TEARING CONFIGURATION FOR FLEXIBLE ELEMENT OF ELASTOMERIC COUPLING

BACKGROUND OF THE INVENTION

This invention relates to flexible shaft couplings, and more particularly, to elastomeric couplings for transmitting torque between two shafts approximately aligned on a shaft axis, i.e., to elastomeric couplings joining a pair of axially spaced shafts.

The invention further relates to such couplings which have annularly discontinuous elastomeric portions.

Attention is directed to U.S. Pat. No. 4,634,400, which issued Jan. 6, 1987 and which is incorporated herein by reference.

DESCRIPTION OF PRIOR ART

A common and recurring problem in the use of couplings of the above described type is premature failure of the elastomer material of the coupling, if the coupling is subjected to excessive torque loads. Such failure commonly occurs in the form of tearing of the elastomeric coupling member along one side of the elastomeric element, which tearing produces an unbalanced condition and vibration in the rotating shafts. The shaft bearings and seals can be damaged by this imbalance, and high stresses are placed on the other coupling components. Additionally, when the coupling tears along one sidewall of the elastomeric element, as the coupling rotates, centrifugal force can cause the torn coupling portion to extend outwardly beyond the normal area of operation and interfere with the guard surrounding the coupling.

SUMMARY OF THE INVENTION

The invention provides an elastomeric coupling for transmitting torque between two shafts approximately aligned on a shaft axis, the coupling including an elastomeric center element having, in a radial plane extending from and along the shaft axis, an inwardly opening generally U-shaped cross-section defined by two axially spaced radially extending leg portions respectively including an inner part bonded to a shoe, and an outer part, and an axially extending bridge portion connected to the outer parts and including a weakened area which is located remotely from the shaft axis and which facilitates tearing of the bridge portion at the weakened area in response to excessive torque loads on the coupling.

In one embodiment of the invention, the weakened area at the outer periphery of the shoe is formed by a generally V-shaped notch in the outer circumferential surface of the elastomeric material of the flexible coupling.

Other features and advantages of the invention will become apparent to those skilled in the art upon review of the following detailed description, claims and drawings.

BRIEF DESCRIPTION OF THE DRAWINGS

FIG. 1 is a perspective view of one embodiment of a portion of a coupling incorporating various of the features of the invention, which view is taken from the inside the coupling.

FIG. 2 is an elevational view of the inside of the coup ng shown in FIG. 1.

FIG. 3 is a partially broken away and sectioned axial side view of the entire coupling shown in FIG. 1, with one half thereof shown in dotted outline.

FIG. 4 is a fragmentary view of a second embodiments of a coupling incorporating various of the features of the invention.

FIG. 5 is a fragmentary view of a third embodiment of a coupling incorporating various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in the drawings is an elastomeric coupling 11 for transmitting torque between first and second axially spaced and oppositely extending shafts 13 and 15 which are approximately aligned on a shaft axis 17.

While other constructions can be employed, in the particularly disclosed construction, the coupling 11 comprises first and second angularly spaced composite elastomeric arcuate members 21 and 23 (FIG. 3) which are of generally identical construction, which respectively extend for approximately 180 degrees, and which respectively include first and second oppositely extending arcuate shoes 31 and 33, and an arcuate elastomeric center element 41 located between the first and second shoes 31 and 33.

Because the first and second composite members 21 and 23 are generally identically constructed, only the composite member 21 will be described in detail. More specifically, the first and second shoes 31 and 33 are also of generally identical construction and each arcuately extends for an arcuate distance which can be almost 180 degrees. In addition, the first and second shoes 31 and 33 extend axially in opposite directions to each other. More particularly, the first and second shoes 31 and 33 each include an inner part 51 which is bonded to the central element 41, and an outer part 53 which extends from the inner part 51 and which is adapted, in any suitable way, to be connected to an associated one of the oppositely extending shafts 13 and 15. In the particularly illustrated construction, the outer parts 53 each include one or more apertures 55 which permit the shoes 31 and 33 to be fixed by bolts 30 to generally cylindrical hubs 32. The hubs 32 include central bores 34 housing the shafts 13 and 15.

The shoes 31 and 33 can take any number of suitable configurations and, in the disclosed construction, the inner and outer parts 51 and 53 are preferably of generally semi-cylindrical configuration. In addition, the shoes 31 and 33 can be fabricated of any suitable metallic or plastic material and, in the disclosed construction, are preferably fabricated of suitable plastic material.

The elastomeric center element 41 is fabricated of flexible elastomeric plastic material and, preferably, from a urethane material such as polyether urethane. In addition, the flexible elastomeric center element 41 extends arcuately for an arcuate distance which is approximately 180 degrees and presents, in a radial plane extending from and along the shaft axis, an inwardly opening generally U-shaped cross-section defined by first and second leg portions 61 and 63 which are generally identically constructed and which are axially spaced from each other, and by a bridging portion 65 which connects the leg portions 61 and 63. More specifically, the leg portions 61 and 63 each include a radially inner part 71 bonded to the cylindrical portion of the associated one of the shoes 31 and 33, and an outer part 73 extending from the inner part 71. Still more particularly, the inner parts 71 respectively include oppositely facing, arcuately extending recesses 75 which receive the inner parts 71 of the associated shoes 31 and 33. In this last regard, and as already mentioned, the shoes 31 and 33 are bonded to the inner parts 71 within the recesses 75. Any suitable method for bonding the shoes 31 and 33 to the inner parts 71 can be employed.

The inside surface of the elastomeric center element 41 can include, as shown in U.S. Pat. No. 4,634,400, a diametrically extending arcuate recess 57 and, near each end of the diametric recess 57, an axially extending relief notch 59 which communicates with the diametric recess 57. The diametric recess 57 can take various forms, and in the construction shown in FIGS. 1 through 3, comprises an inner portion in the form of a radially extending slot having parallel sides and an outer portion which is generally of semi-circular configuration. The diametric recess 57 divides the center element 41 into the two axially spaced leg portions 61 and 63 which, as already indicated, are connected by the bridging portion 65.

More particularly, the bridging portion 65 is connected to the outer parts 75 of the leg portions 61 and 63 and includes a weakened area 81 which is located at maximum distance from the shaft axis 17 and which facilitates tearing of the bridge portion 65 at the weakened area 81 in the event there is an excessive load placed on the torque transmission coupling. In this last regard, while other constructions can be employed, in the preferred construction, the bridging portion 65 includes an outer surface 83 including a circumferentially extending recess 85 which defines the weakened area 81. In the preferred form of the invention the two leg portions 61 and 63 each have a greater thickness in the axial direction at their radially inner portions than the thickness at radially outer portions, and the thickness of portions 61 and 63 decreases generally uniformly from their radially inner portions to the radially outer portions.

In the illustrated embodiment of the invention the weakened area 85 is defined by a generally V-shaped notch. The provision of a V-shaped notch has the further advantage of reducing the axial forces on the two shafts 13 and 15 connected by the flexible coupling. It will be appreciated that rotation of the coupling will cause radial outward forces on the elastomeric material of the flexible coupling. In prior art couplings, elastomeric material distorts radially outwardly tending to apply an axial force on the connected shafts tending to pull them together. These forces on the shafts can increase the loads on the bearings supporting the shafts. In the present invention, by reducing the mass of material at the outer circumference of the coupling, there is less circumferential force on the elastomeric material of the coupling and less axial force on the shafts. Additionally, because the V-shaped configuration of the notch alters the mass distribution and stiffness properties, this configuration counteracts the tendency for material to distend outwardly due to centrifugal force during rotation of the coupling. This reduces the inward force known to pull the shoes and shafts together axially in designs not incorporating a V-shaped configuration.

The weakened area 81 also can be provided by other arrangements, as by locating a circumferentially extending recess (not shown) on the interior surface of the bridging portion 65. In a further alternate construction, the bridging portion 65 could simply be configured to include an circumferentially extending area of lesser cross-section in the area of the bridging portion 65 most remote from the shaft axis 17. Thus, in general, the bridging portion 65 can be fabricated so that the weakest area thereof extends circumferentially and is located at the radially most remote point from the shaft axis 17.

Thus with the disclosed construction, if excessive loading is imposed on the disclosed coupling 11, the coupling 11 will fail or tear at the weakened area 81, with the result that the torn portion or portions will have approximately the same radial length from the shaft axis 17, which radial length is also approximately the radial extent of the coupling 11 before tearing. Such construction avoids interference with the coupling guard surrounding the coupling.

Shown in FIG. 4 is a second embodiment of a coupling 111 which is of generally the same construction as that shown in FIGS. 1 through 3, except that the diametric recess 57 is, in radial cross-section, of generally enlarged circular shape instead of the radial slot and semi-cylindrical shape referred to above.

Shown in FIG. 5 is a third embodiment of a coupling 211 which is of generally the same construction as that shown in FIGS. 1 through 3, except that the axial notches 59 have been omitted.

Various of the features of the invention are set forth in the following claims.

What is claimed is:

1. An elastomeric coupling for transmitting torque between two shafts approximately aligned on a shaft axis, said coupling comprising a composite arcuately extending member including a shoe having a first portion and a second portion extending from said first portion and adapted to be connected to one of said shafts, and an elastomeric center element having, in a radial plane extending from and along said shaft axis, an inwardly opening generally U-shaped cross-section defined by two axially spaced radially extending leg portions respectively including an inner part bonded to said first portion of said shoe, and an outer part, and an axially extending bridge portion connected to said outer parts and including a weakened area which is located remotely from said shaft axis and which facilitates tearing of said bridge portion at said weakened area in response to excessive transmission of force as compared to tearing of said bridge portion at other areas.

2. An elastomeric coupling in accordance with claim 1 wherein said inner part includes an arcuate recess receiving said cylindrical part of said shoe.

3. An elastomeric coupling in accordance with claim 1 wherein said center element is fabricated of plastic material.

4. An elastomeric coupling in accordance with claim 1 wherein said center element is fabricated of polyether urethane material.

5. An elastomeric coupling in accordance with claim 1 wherein said shoe is fabricated of plastic material.

6. An elastomeric coupling in accordance with claim 1 wherein said shoe is fabricated of metallic material.

7. An elastomeric coupling in accordance with claim 1 wherein said bridge portion includes an outer surface, and wherein said weakened area comprises a recess in said outer surface.

8. An elastomeric coupling in accordance with claim 1 wherein said weakened area comprises an area of reduced thickness.

9. An elastomeric coupling in accordance with claim 1 wherein said weakened area comprises an area of reduced strength.

10. An elastomeric coupling in accordance with claim 1 wherein said weakened area is located at maximum radial distance from said axis.

11. An elastomeric coupling for transmitting torque between two shafts approximately aligned on a shaft axis, said coupling comprising a composite arcuately extending member including an arcuately extending shoe having an arcuately extending portion and a second portion extending from said arcuately extending portion and adapted to be connected to one of said shafts, and an arcuately extending, flexible elastomeric center element having, in a radial plane extending from and along said shaft axis, an inwardly opening generally U-shaped cross-section defined by two axially spaced radially extending leg portions respectively including an inner part bonded to said arcuately extending portion of said shoe, and an outer part, and an axially extending bridge portion connected to said outer parts and including a weakened area which is located remotely from said shaft axis and which facilitates tearing of said bridge portion at said weakened area in response to excessive transmission of force as compared to tearing of said bridge portion at other areas.

12. An elastomeric coupling for transmitting torque between two shafts approximately aligned on a shaft axis, said coupling comprising a composite semi-annular member including a first semi-annular shoe having a cylindrical portion and an outer portion extending from said cylindrical portion and adapted to be connected to one of said shafts, a second semi-annular shoe spaced axially from said first shoe and having a cylindrical portion extending toward said cylindrical portion of said first shoe, and an outer portion extending from said cylindrical portion and adapted to be connected to the other one of said shafts, and a semi-annular flexible elastomeric center element having, in a radial plane extending from and along said shaft axis, an inwardly opening generally U-shaped cross-section defined by a first radially extending leg portion including an inner part bonded to said cylindrical portion of said first shoe, and an outer part extending from said inner part, and a second radially extending leg portion located in spaced axial relation to said first leg portion and including an inner part bonded to said cylindrical portion of said second shoe, and an outer part extending from said inner part of said second leg portion, and an axially extending bridge portion connected to said outer parts of said first and second legs and including an outer surface defining a weakened area of lesser cross-section facilitating tearing of said bridge portion at said weakened area in response to excessive transmission of force as compared to tearing of said bridge portion at other areas.

13. An elastomeric coupling in accordance with claim 12 wherein said center element includes an arcuately extending radial recess which separates said first and second leg portions.

14. An elastomeric coupling in accordance with claim 13 wherein said center element also includes, at each end of said radial recess, an axially extending notch.

15. An elastomeric coupling for transmitting torque between two shafts approximately aligned on a shaft axis, said coupling comprising a first composite semi-annular member including a first semi-annular shoe having a cylindrical portion, and an outer portion extending from said cylindrical portion of said first shoe of said first member and adapted to be connected to one of said shafts, a second semi-annular shoe spaced axially from said first shoe of said first member and having a cylindrical portion extending toward said cylindrical portion of said first shoe of said first member, and an outer portion extending from said cylindrical portion of said second shoe of said first member and adapted to be connected to the other one of said shafts, and a semi-annular flexible elastomeric center element located between said first and second shoes of said first member and having, in a radial plane extending from and along said shaft axis, an inwardly opening generally U-shaped cross-section defined by a first radially extending leg portion including an inner part bonded to said cylindrical portion of said first shoe of said first member, and an outer part extending from said inner part of said first leg portion of said center element of said first member, a second radially extending leg portion located in spaced axial relation to said first leg portion of said center element of said first member and including an inner part bonded to said cylindrical portion of said second shoe of said first member, and an outer part extending from said inner part of said second leg portion of said center element of said first member, and an axially extending bridge portion connected to said outer parts of said first and second leg portions of said center element of said first member and including an outer surface defining a weakened area of lesser cross-section which is located at maximum distance from said axis and which facilitates tearing of said bridge portion of said center element of said first member at said weakened area of said bridge portion of said central element of said first member in response to excessive transmission of force, and a second composite semi-annular member including a first semi-annular shoe having a cylindrical portion, and an outer portion extending from said cylindrical portion of said first shoe of said second member and adapted to be connected to one of said shafts, a second semiannular shoe spaced axially from said first shoe of said second member and having a cylindrical portion extending toward said cylindrical portion of said first shoe of said second member, and an outer portion extending from said cylindrical portion of said second shoe of said second member and adapted to be connected to the other one of said shafts, and a semi-annular flexible elastomeric center element located between said first and second shoes of said second member and having, in a radial plane extending from and along said shaft axis, an inwardly opening generally U-shaped cross-section defined by a first radially extending leg portion including an inner part bonded to said cylindrical portion of said first shoe of said second member, and an outer part extending from said inner part of said first leg portion of said center element of said second member, a second radially extending leg portion located in spaced axial relation to said first leg portion of said center element of said second member and including an inner part bonded to said cylindrical portion of said second shoe of said second member, and an outer part extending from said inner part of said second leg portion of said center element of said second member, and an axially extending bridge portion connected to said outer parts of said first and second leg portions of said center element of said second member and including an outer surface defining a weakened area of lesser cross-section which is located at maximum distance from said axis and which facilitates tearing of said bridge portion of said center element of said second member at said weakened area of said bridge portion of said central element of said second member in response to excessive transmission of force.

* * * * *